May 19, 1925.
A. B. McKINLEY ET AL
1,538,127
DUMP TRUCK
Filed Feb. 16, 1924
3 Sheets-Sheet 1
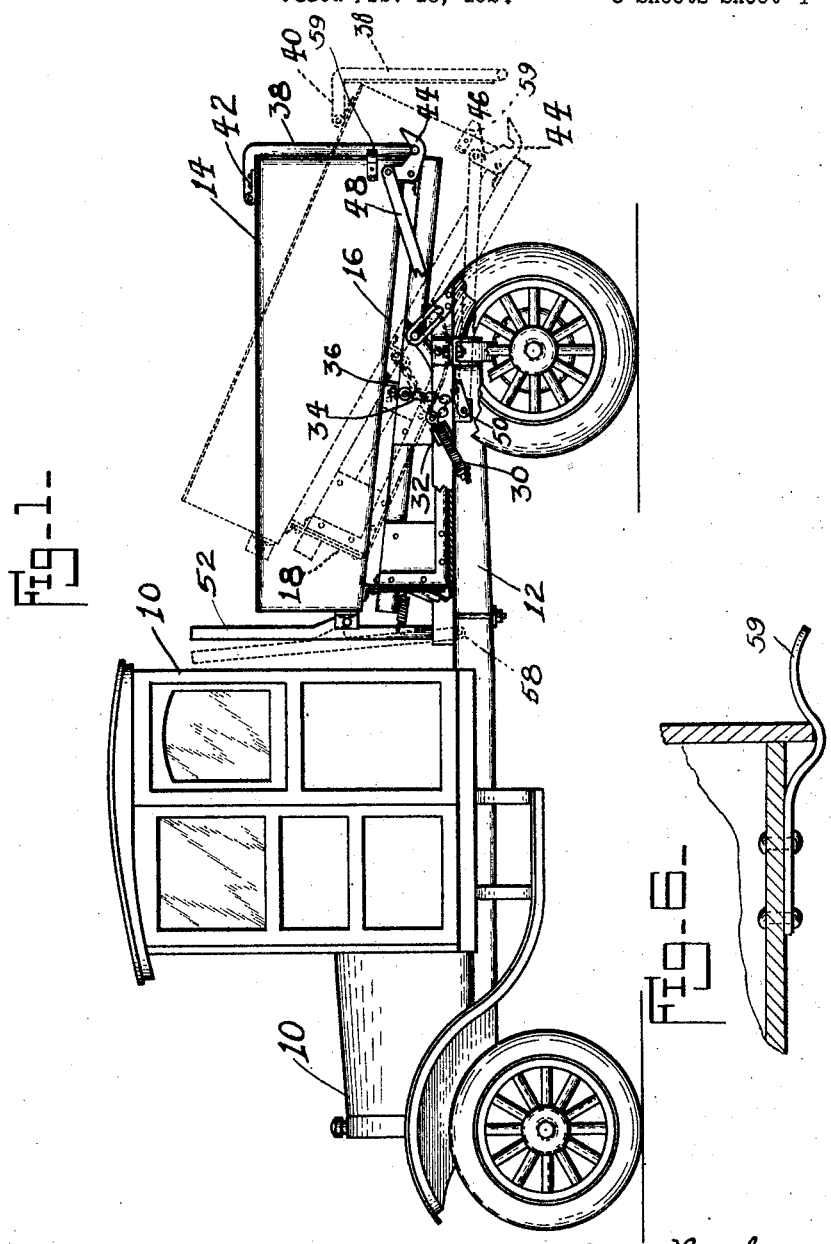

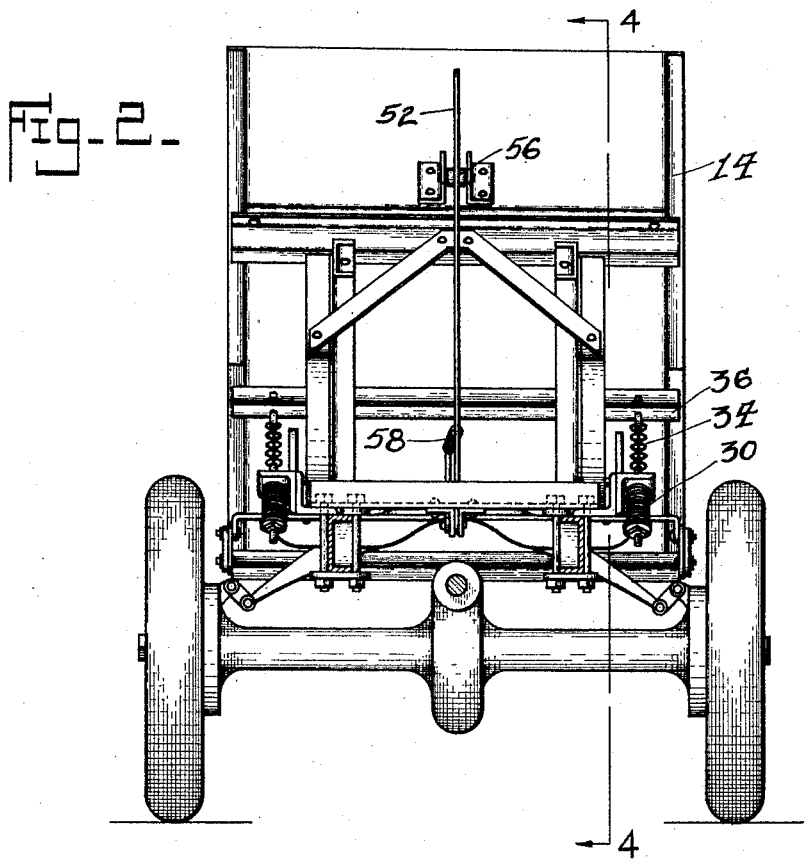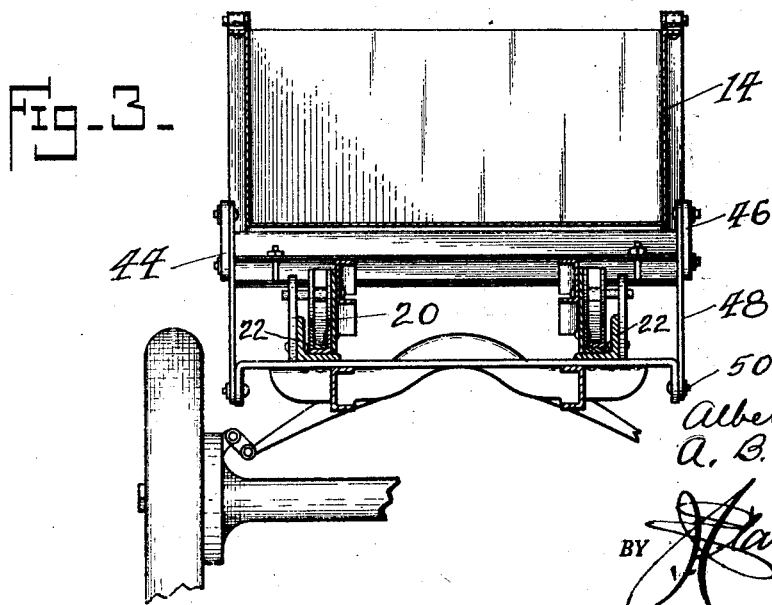

May 19, 1925.  
A. B. McKINLEY ET AL  
1,538,127  
DUMP TRUCK  
Filed Feb. 16, 1924   3 Sheets-Sheet 3
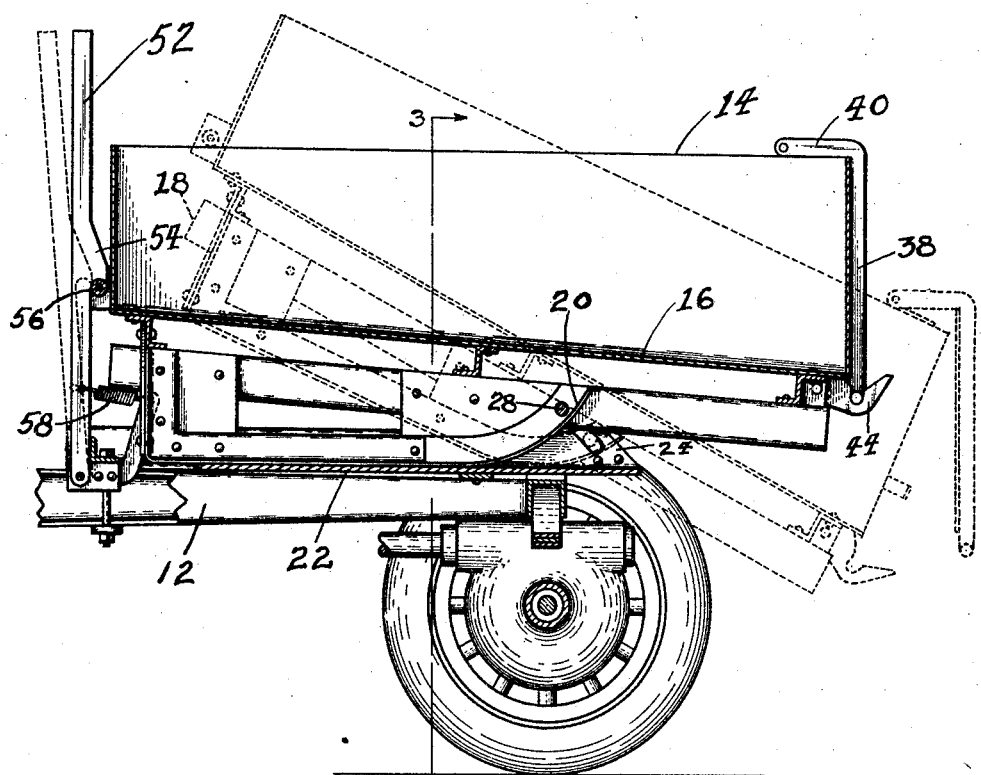
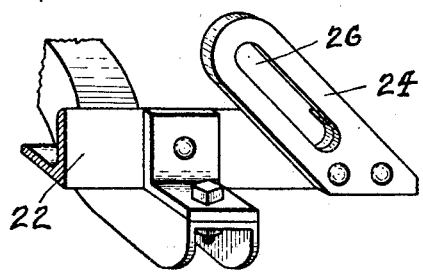
Albert Hurley  
A. B. McKinley  
INVENTOR.  
BY  
ATTORNEYS.

Patented May 19, 1925.

1,538,127

UNITED STATES PATENT OFFICE.

ANDREW B. McKINLEY AND ALBERT HURLEY, OF LOUISVILLE, KENTUCKY, ASSIGNORS TO CONTINENTAL CAR COMPANY OF AMERICA, OF LOUISVILLE, KENTUCKY, A CORPORATION OF KENTUCKY.

DUMP TRUCK.

Application filed February 16, 1924. Serial No. 693,357.

*To all whom it may concern:*

Be it known that ANDREW B. McKINLEY and ALBERT HURLEY, citizens of the United States, residing at Louisville, in the county of Jefferson and State of Kentucky, have invented certain new and useful Improvements in Dump Trucks, of which the following is a specification.

This invention relates to improvements in gravity operated dump bodies especially for automobile trucks or the like, and has for its principal object the provision of such a dump body which shall be, in itself, automatic in operation, both as to discharging a load and as to righting itself or regaining its original load carrying position after the load has been dumped.

One important object of the invention is to provide an improved form of truck and body therefor wherein the body is normally supported with its floor at an angle to the frame of the truck by improved rolling dumping means.

Another important object of this invention is the provision of a gravity operated dump truck body provided with an automatically operating tailgate whereby when the body assumes a load discharging position the tailgate will, at the same time, be automatically released and will open so that the load will be conveniently and fully discharged.

Still another important object of this invention is the provision, in a gravity operated dump truck body of shock absorbing elements whereby the motion of the body will be gradually brought to a stop when approaching full load discharging position, thereby eliminating blows or shocks to the truck chassis and which shock absorbing means will, moreover, assist in returning the body to its normal horizontal position.

Still another and further important object of this invention is the provision of means upon the under frame of a truck for dump bodies whereby the body will be at all times maintained in perfect alignment with the truck chassis, no matter what the operating position, and regardless of rough usage.

Still another object of the invention is to provide means for preventing rebound of the tailgate in a truck of this description.

Other and further important objects of the invention will be apparent from the disclosures in the accompanying drawings and following specification.

The invention, in a preferred form, is illustrated in the drawings and hereinafter more fully described.

In the drawings:

Figure 1 is a side elevation of the improved truck body of this invention, parts being broken away and with the dumping position of the body illustrated in dotted lines.

Figure 2 is an elevation of the forward end of the truck body taken vertically through the truck at a point directly behind the cab and showing the body in dumping position.

Figure 3 is a vertical sectional view taken on the line 3—3 of Figure 4, looking in the direction indicated by the arrows.

Figure 4 is a vertical longitudinal sectional view taken on the line 4—4 of Figure 2.

Figure 5 is a detail view illustrating the means for positioning the body with respect to the rear cross member of the truck chassis and illustrating one of the guide plates whereby the body is at all times maintained in proper tracking relation with the chassis.

Figure 6 is an enlarged detail section showing the spring case for preventing rebound of the tailgate.

As shown in the drawings:

The reference numeral 10 indicates generally an automobile truck of the usual construction which, of course, may also be a horse-drawn vehicle. Tiltably mounted on the chassis 12 of the truck 10 is a dump body 14 having the floor 16 thereof arranged at an angle of about fifteen degrees to the horizontal and sloping toward the rear.

Securely fastened to the under part of the forward portion of the body 14 is a supporting element 18 which terminates at its rear end or at a point approximately beneath the middle portion of the truck body in upwardly curved tracking members as illustrated at 20. These tracking members 20 are adapted to co-operate with corresponding track elements 22 in the form of angle irons fixed to the chassis 12.

Suitable guides are provided whereby proper cooperative tracking relation is maintained between the members 20 and the tracks 22 and comprise upstanding elements 24 provided with angular slots therein as best illustrated at 26 in Figure 5. Pins 28 securely affixed to the tracking members 20 of the body extend laterally therefrom and are adapted to be fitted into the slots 26 and ride therein during the dumping movement of the body 14. These pins 28 acting in the slots 26 also provide a retaining means whereby the body is securely maintained in position upon the chassis at all times.

Suitable shock absorbing or cushioning elements are provided for gradually arresting the motion of the body 14 when the load is being dumped and comprise mainly helical sprints 30 suitably mounted in sockets or the like 32 affixed to the chassis 12. Chains 34 are attached at one end to the springs 30 and at the other end to suitable projections 36 on the truck body and the position of the springs together with their cooperating elements is such that the blow or shock caused by the arresting of the motion of the body is not transmitted directly to the chassis as ordinarily happens in the usual construction.

The rear end of the body 14 is open and is normally covered by a tailgate or the like 38 provided at its upper end with forwardly extending elements 40, the ends of which are attached to suitable hinges 42 affixed to the body 14. It will be evident that by this construction the lower end of the tail gate 38 is allowed to move in an arc of a circle having its center at the pivotal point of the hinges 42 and not at the rear uppermost end of the body 14. Adapted to co-operate with the lower edge of the tail gate 38 is a pair of hooks or locking elements 44 pivotally mounted upon the body 14 and provided with upwardly extending arms 46, to each of which, in turn, is pivotally attached the end of an operating arm 48 which has its other end pivoted to the chassis 12 as best illustrated at 50 in Figure 1.

Adjacent the front of the body 14 and directly behind the cab of the truck 10 in a position to be readily operated by the driver of the truck is a dumping lever 52 having its lower end pivotally attached to the chassis and provided with an integral extension 54 at a point approximately one-half its height. The extension 54 has its lower edge formed in the shape of a hook or a similar element and is adapted to co-operate with a locking roller or the like 56 mounted on the body 14. A helical spring 58 is suitably attached to an upstanding element mounted on the chassis 12 and has its outer end suitably joined to the lever 52 whereby the same will be positively drawn into locking relation with the roller 56.

When the truck has been dumped and dropped back to normal position the tail gate 38 has a tendency to rebound after striking the rear end of the body. To stop this there is provided a spring latch 59, one of these latches being locked on each side. These latches are preferably of the form shown in Figure 6 and thus does not interfere with the dumping operation but, when the tail gate swings shut after dumping, are sufficiently strong to retain it in its proper position until the hooks 44 may act.

The operation is as follows:

Upon a load being dumped into the body 14 this load will tend to gravitate toward the rear end of the body on account of the sloping bottom. Even though the material of the load be relatively stable and compact the motion of the vehicle which naturally occurs when it is being driven will cause the load to distribute itself as described, whereby the center of gravity of the body with its contents will be at a point somewhat in the rear of the balancing point or point of suspension of the body itself when empty. Thus when the locking device 52—56 is released the body will dump automatically.

At the same time the operating arms 48 will cause the locking hooks 44 to pivot about their suspension points, thereby releasing the lower edge of the tail gate 38 from the notches in said hooks and the action of gravity will cause the tail gate to pivot about the hinges 42, assuming the position illustrated in the dotted lines in Figures 1 and 4. The load will therefore be automatically dumped and on account of the original fifteen degree slope of the floor the proper dumping angle of approximately forty-five degrees can be arrived at with a correspondingly less angular motion of the body 14.

The motion of the body when approaching the end of its dumping travel will be gradually checked by the springs 30, and as soon as the entire load is discharged the action of these springs together with the greater weight of the forward portion of the body 14 will tend to return the body to normal position, whereupon the tail gate will also automatically close and the locking lever 52 be brought into proper co-operative locking relation with the roller 56 by the action of the spring 58.

It will be evident that herein is provided a gravity operated dump truck body which will automatically empty itself upon release of its locking means and after being emptied will further automatically return to normal load carrying position, these motions being accomplished with an ease of operation and simplicity of motion so as to insure the desired results and without further effort on the part of the operator. Moreover, the sloping floor will automatically compensate for any improper original distribution of the load, and the resultant decrease in the height of the front end of the body allows of its being placed closer to the cab than can be ordinarily done.

We are aware that many changes may be made and numerous details of construction varied throughout a wide range without departing from the principles of this invention, and we therefore do not purpose limiting the patent granted hereon otherwise than as necessitated by the prior art.

We claim as our invention:

1. The combination with a motor vehicle having side frame members; of a pair of angle irons supported above said side frame members each with one leg vertical and the other projecting horizontally inward to form guide rails, a dump body having a floor and a pair of supporting sills beneath the floor and running longitudinally of the body, and a pair of supporting and rocker rails each having an upturned forward end secured to the forward part of a respective sill and an upwardly curved rear rocker portion secured at its extremity to said sill, the intermediate portion of each rocker rail being rectilinear and normally resting flat on the horizontal flange of a respective guide rail.

2. The combination with a motor vehicle having side frame members each consisting of a channel iron having a vertical web and inwardly projecting horizontal flanges; of a pair of angle irons supported above said side frame members each with one leg vertical and the other projecting inwardly to form guide rails, the inner edges of the horizontal legs overlapping the webs of said channels, and a dump body having a floor and a pair of supporting sills beneath the floor and running longitudinally of the body and a pair of supporting and rocker rails secured at their ends to the sills and each consisting of an angle iron having a horizontal leg resting on a respective first mentioned angle iron and having a vertical leg alined substantially vertical above a respective channel web.

In testimony whereof we affix our signatures.

ANDREW B. McKINLEY.
ALBERT HURLEY.